Dec. 9, 1941.  L. F. CRAWFORD  2,265,519
SHAKER CONVEYER
Filed April 19, 1940   3 Sheets-Sheet 1
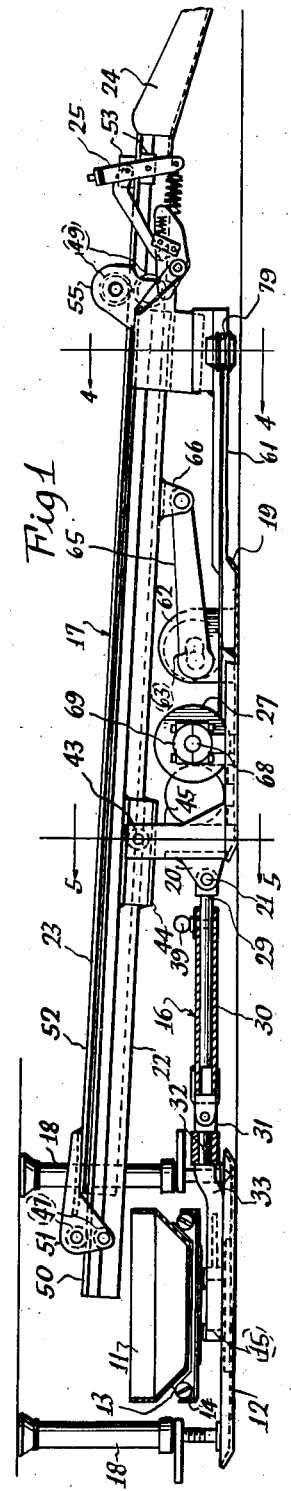
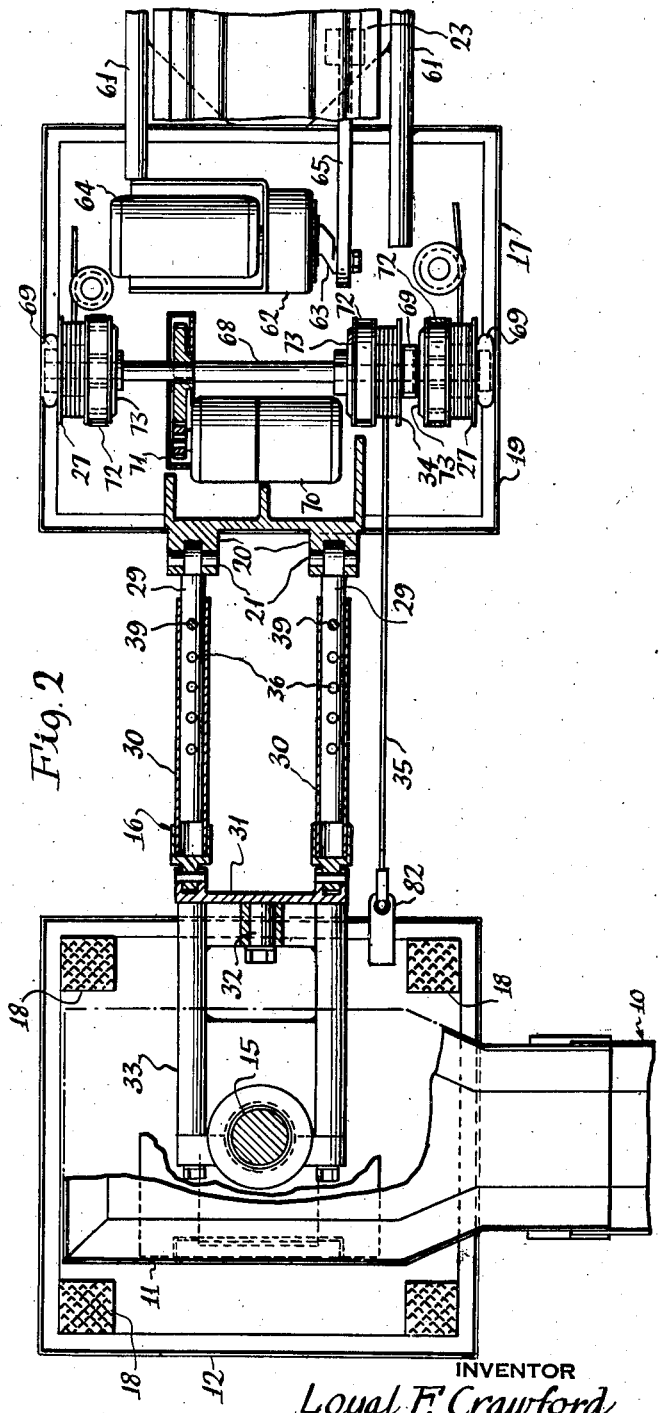
INVENTOR
Loyal F. Crawford
BY
Clarence F. Poole
ATTORNEY

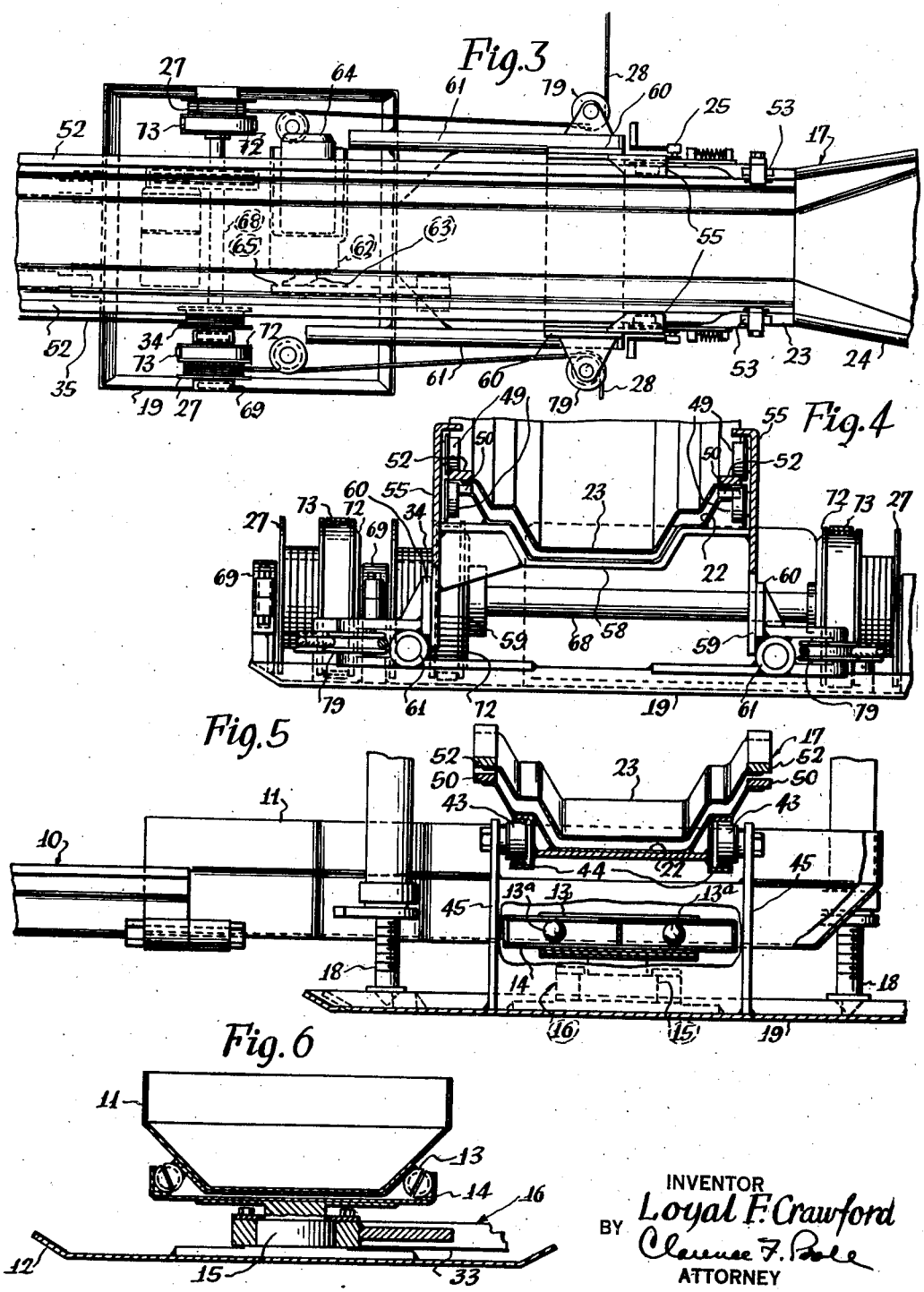

Dec. 9, 1941.  L. F. CRAWFORD  2,265,519
SHAKER CONVEYER
Filed April 19, 1940  3 Sheets-Sheet 3
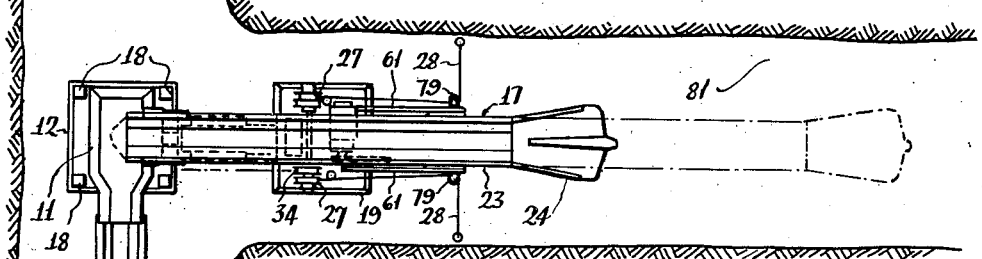
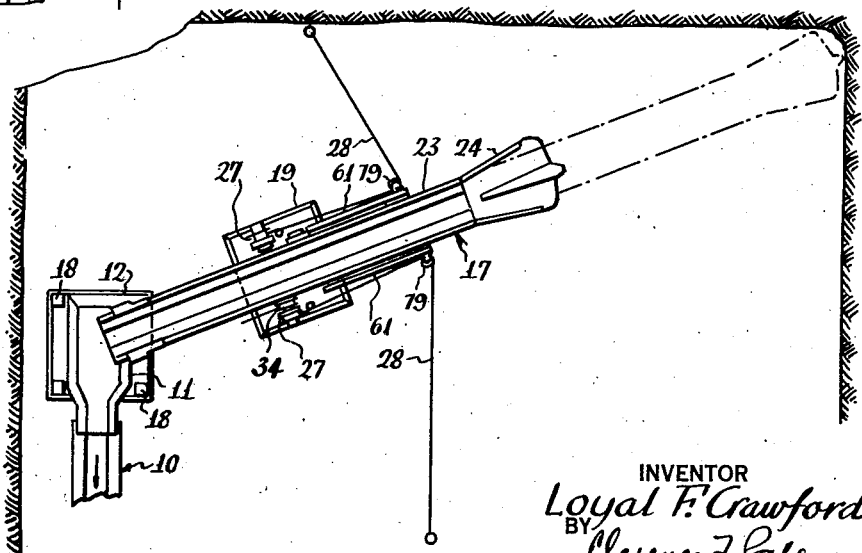
INVENTOR
Loyal F. Crawford
BY Clarence F. Poole
ATTORNEY Patented Dec. 9, 1941

REISSUED
FEB 1943

2,265,519

UNITED STATES PATENT OFFICE 2,265,519

SHAKER CONVEYER

Loyal F. Crawford, Chicago, Ill., assignor to Goodman Manufacturing Company, Chicago, Ill., a corporation of Illinois Application April 19, 1940, Serial No. 330,477

14 Claims. (Cl. 198—220)

This invention relates to improvements in shaker conveyers and more particularly relates to an improved device for loading material onto a shaker conveyer trough line.

Heretofore, shaker conveyers having loading devices or shovels on the forward end of the trough line have been commonly used for loading mined coal from rooms and entries of mines. The use of these loading devices, however, has been limited due to the fact that the loading device has been reciprocably driven from the main trough line, which restricts the range of lateral swinging movement of the device to the extent that material cannot be picked up from the corners of wide rooms, or from breakthroughs or entires at right angles to the main trough line. It has been attempted to remedy these difficulties by placing curved troughs in the trough line, which will permit material to be conveyed around corners by the action of the shaker conveyer. These corners may be as great as 90 degrees, but these curved troughs besides reducing the efficiency of the conveying motion at the receiving end of the trough line also take up considerable space, so can only be used in wide working places having good roof conditions, and the curved portion of the trough line must be torn down when it is desired to pick up material in advance of the main trough line.

The principal objects of my present invention are to remedy these difficulties by providing a simplified and compact form of loading device for a shaker conveyer trough line, which will efficiently load material from extreme positions with respect to the main trough line as well as from in front of the main trough line.

A more specific object of my invention is to provide a loading device of the class described, which consists in an independent shaker conveyer loading unit mounted for slidable movement along the ground, together with a guiding connection between this conveyer and the main trough line, to hold this loading unit in the proper relation with respect to the main trough line and permit this loading unit to load material onto the main trough line when at various extreme angles of adjustment with respect thereto.

Other objects of my invention will appear from time to time as the following specification proceeds and with reference to the accompanying drawings wherein:

Figure 1 is a view in side elevation of a loading device constructed in accordance with my invention connected with a shaker conveyer trough line, with certain parts shown in section;

Figure 2 is an enlarged fragmentary plan view of the device shown in Figure 1, with certain parts broken away and certain other parts shown in horizontal section, in order to more clearly illustrate certain details of my invention;

Figure 3 is a fragmentary plan view of the device shown in Figure 1, drawn to substantially the same scale as Figure 1 and showing certain details of my invention not illustrated in Figures 1 and 2;

Figure 4 is an enlarged transverse sectional view taken substantially along line 4—4 of Figure 1;

Figure 5 is an enlarged transverse sectional view taken substantially along line 5—5 of Figure 1 and also showing certain parts of the main trough line in section;

Figure 6 is a transverse sectional view taken through the point of connection of the loading device to the main trough line;

Figure 7 is a diagrammatic view showing the device operating in an entry at right angles to the conveyer trough line; and Figure 8 is a diagrammatic view showing the device loading in a relatively wide working place.

In the embodiment of my invention illustrated in the drawings, a conveyer trough line 10 is shown. Said conveyer trough line may be of a usual form and construction, arranged so as to be extended along an entry or room as the mining operation progresses, and may be driven from a usual type of reciprocable drive mechanism in such a manner that the reciprocable motion of said trough line will cause material to move therealong from the inby to outby end thereof.

The trough line 10 has a hopper-like trough 11 secured at its forward end, which is mounted on a base 12 for reciprocable movement with respect thereto. Said hopper-like trough has a widened forward portion, a closed forward end, and is mounted on the base 12 on a usual type of ball frame, which includes an upper frame 13 connected to the underside of said trough section and having guides for balls 13a, 13a extending therealong and a lower frame 14 having corresponding guides for said balls. The lower frame 14 is mounted on said base on the upper end of a boss 15, which forms a bearing boss for a control link 16 for an extensible loading device generally indicated by reference character 17. A plurality of jacks 18, 18, adapted to be interposed between said base and the mine roof, are provided to hold said base in position on the mine bottom.

With reference now in particular to the details of the extensible loading device 17 and several novel features of my invention, said loading device includes a base plate 19 mounted for slidable movement along the ground and transversely pivoted to the control link 16 on a pair of spaced apart outwardly extending bifurcated ears 20, 20 by means of pivotal pins 21, 21. A reciprocating trough section 22 and an extensible trough section 23, adapted to be nested in or extended from said reciprocating trough section, are mounted on said base for reciprocable movement with respect thereto. Said extensible trough section has a shovel 24 on its forward end, and as herein shown is extended or retracted with respect to said reciprocating trough section by means of an ordinary type of friction grip feeding device generally indicated by reference character 25.

The loading device 17 is moved about the mine and swung about the axis of the bearing boss 15, by means of a pair of winding drums 27, 27 having flexible cables 28, 28 mounted thereon and adapted to be attached to fixed abutments remote from the machine. The support for said winding drums on said base and the drive thereto will hereinafter be more clearly described as this specification proceeds.

The control link 16, as herein shown, includes a pair of parallel spaced members 29, 29 transversely pivoted to the ears 20, 20 on the pivotal pins 21, 21. Said members are slidably engaged within connecting and guide members 30, 30, which are transversely pivoted at their rear ends to opposite ends of a yoke 31. Said yoke is provided with a rearwardly extending stub shaft 32 which is pivotally mounted in a pivoted frame 33 for movement about an axis extending longitudinally of said control link. Said pivoted frame in turn is pivoted on the bearing boss 15 for pivotal movement about a vertical axis.

The members 29, 29 may be extended or retracted with respect to the connecting and guide members 30, 30, by means of a winding drum 34 having a flexible cable 35 adapted to be wound thereon. Said winding drum as herein shown is mounted coaxial with the winding drums 27, 27.

A plurality of spaced apertures 36, 36 are provided in the members 29, 29, which are adapted to register with suitable apertures provided in the connecting and guide members 30, 30. Said apertures are adapted to be engaged with pins 39, 39, for locking said members in position with respect to said connecting and guide members and holding the base 19 in fixed horizontal spaced relation with respect to the base 12.

The supporting connection for the reciprocating trough section 22 on the base 19 includes a pair of spaced apart anti-friction rollers 43, 43 engageable with the upper and lower flanges of a pair of spaced apart channels 44, 44, extending along opposite sides of said trough section. Said rollers are mounted on spaced apart brackets 45, 45, projecting upwardly from said base.

The trough sections 22 and 23 are held in nested relation with respect to each other by means of two pairs of spaced apart rollers 47, 47 mounted on the rear of said extensible trough section, and two other pairs of spaced apart rollers 49, 49 mounted on the forward end of said reciprocating trough section.

Each pair of rollers 47, 47 is adapted to engage the upper and lower sides of bearing flanges 50, 50 extending along opposite upper sides of the trough section 22. Said rollers are mounted on spaced apart brackets 51, 51 projecting rearwardly from opposite bearing flanges 52, 52, which bearing flanges extend along opposite upper sides of the trough section 23. Said last mentioned flanges are adapted to be selectively engaged by grip blocks 53, 53 of the feeding mechanism 25, for extending or retracting said extensible trough section with respect to said reciprocating trough section in the usual manner.

The spaced apart rollers 49, 49 are mounted in brackets 55, 55, which project forwardly of the forward end of the trough section 22 and extend upwardly therefrom (see Figure 4). Said rollers are adapted to engage the upper and lower sides of the bearing flanges 52, 52. The brackets 55, 55 are secured to the trough section 22 by means of a cross member 58 secured to and extending beneath said trough section and formed to conform generally to the shape of the lower part of said trough section. Said brackets are provided with depending sides 59, 59 adapted to slidably engage the inner sides of guide members 60, 60. Said guide members are spaced forwardly of the base 19 and are mounted on the outer ends of arms 61, 61 projecting forwardly from said base.

It should here be noted that the trough sections 22 and 23 are supported on the base 12 on the rollers 43, 43 and are supported on the ground at the forward end of the trough section 23 on the shovel 24, and that the rollers 49, 49 and depending portions 59, 59 of the brackets 55, 55 serve only as guiding means for said trough sections to hold them in alignment with respect to said base and in nested relation with respect to each other.

The means for reciprocably driving the trough sections 22 and 23 includes a reciprocable conveyer drive mechanism 62 mounted on the base 19 adjacent the forward end thereof. Said drive mechanism is no part of my present invention and may be of any construction well known to those skilled in the art, so will not herein be shown or described in detail. As herein shown, said drive mechanism includes a crank 63 driven at a variable angular velocity by a motor 64 through a suitable reduction device and motion varying mechanism (not shown). The drive connection from said drive mechanism to the trough section 22 consists of a pitman 65 journaled at one of its ends on the crank 63 and pivotally connected at its opposite end to a connecting member 66, depending from said trough section.

The winding drums 27, 27 and 34 are mounted on a transverse shaft 68, journaled in bearing brackets 69, 69 projecting upwardly from the base 19. A motor 70 mounted on said base is provided for driving said shaft through a gear train generally indicated by reference character 71. Each of said winding drums, as herein shown, is driven from said shaft by means of a separate planetary geared reduction device generally indicated by reference character 72. Said planetary geared reduction device may be controlled by friction bands 73, 73 in a usual manner and may be of any usual construction well known to those skilled in the art, so will not herein be shown or described in detail.

The flexible cables 28, 28 on the winding drums 27, 27 may extend forwardly from said drums and around sheaves 79, 79, mounted on the forward ends of the arms 61, 61, for attachment to fixed abutments remote from said arms, for swinging the base 19 about the axis of the bearing boss 15, in an obvious manner.

In Figure 7, the shaker conveyer pan line 10 is shown as extending along a main entry 80 with the loading device positioned to load from a cross entry 81. As the coal is undercut and broken down, the shovel 24 may be extended into the loose material by the feeder head 25 in the usual manner, as the reciprocating and extensible trough sections are reciprocably driven from the drive mechanism 62. Movement of said shovel from side to side, about the axis of the bearing boss 15, is effected by means of the cables 28, 28 and winding drums 27, 27 in the hereinbefore described manner. When it is desired to extend the entire loading device, the cable 35 on the winding drum 34 may be attached to a fixed abutment remote from the machine and the pins 39, 39 may be removed from the apertures 36, 36. Said loading device may then be extended by applying power to said winding drum and when extended to the desired extent may again be locked in fixed spaced relation with respect to the base 12 by means of the pins 39, 39. If it is desired to move the loading device towards the base 12 from an extended position, the cable 35 may be attached to a lug 82 on said base, and power may be applied to the winding drum 34 upon removal of the pins 39, 39 from their respective apertures. If desired, the length of the trough section 22 may be increased by the addition of additional trough sections, and while the degree of extension of the connecting link 16 is herein shown as being relatively small, said link may readily be constructed to permit a greater amount of extension if necessary.

In Figure 8, the loading device is shown in operation in a relatively wide room. When loading from an extreme position such as is shown in this figure, one corner jack 18 must be removed to permit the gathering device to pass thereby. The loading and positioning and extending operations are otherwise the same as described with reference to Figure 7.

It may be seen from the foregoing that a simplified and compact form of loading device of a novel construction has been provided for loading material onto a shaker conveyer trough line which consists in a relatively short shaker conveyer trough line mounted on a base and driven from a drive mechanism independently of the drive mechanism for the main trough line and pivotally connected to the main trough line for swinging movement with respect thereto about a vertical axis, by means of a connecting link so arranged as to permit the base 19 to follow an uneven mine bottom.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a loading device for a shaker conveyer trough line, a base adapted to be held from movement with respect to the ground during operation of the conveyer, a hopper mounted on said base for reciprocable movement with respect thereto and communicating with and having connection with the inby end of said trough line, an independently operable gathering unit adapted to pick up material from the ground and discharge it into said hopper, and a guiding connection between said base and gathering unit, for guiding said gathering unit, for movement about said base to discharge material into said hopper in all positions of said gathering unit with respect to said base including a guiding and control link having connection with said gathering unit and mounted on said base beneath said hopper for pivotal movement about a vertical axis, said guiding and control link including a yoke pivotally mounted for movement about an axis extending longitudinally thereof and connecting members transversely pivoted to said yoke at one of their ends and to said gathering unit at their opposite ends, to permit said gathering element to follow an uneven mine floor while being moved about said base.

2. In a loading device for a shaker conveyer trough line, a base adapted to be held from movement with respect to the ground during operation of the conveyer, a hopper mounted on said base for reciprocable movement with respect thereto and communicating with and having connection with the inby end of said trough line, an independently operable gathering unit including a reciprocably driven shovel adapted to pick up material from the ground and discharge it into said hopper, and a guiding connection between said base and gathering unit for holding said gathering unit in fixed spaced relation with respect to said base and for guiding said gathering unit for movement about said base including an extensible guiding and control link mounted on said base beneath said hopper for pivotal movement about a vertical axis and having transverse pivotal connection with said gathering unit.

3. In a loading device for a shaker conveyer trough line, a base adapted to be held from movement with respect to the ground during operation of the conveyer, a hopper mounted on said base for reciprocable movement with respect thereto and communicating with and having connection with the inby end of said trough line, an independently operable mobile gathering unit including a reciprocably driven shovel adapted to pick up material from the ground and discharge it into said hopper, and a guiding connection between said base and gathering unit for holding said gathering unit in fixed spaced relation with respect to said base and for guiding said gathering unit for movement about said base including a guiding and control link mounted on said base beneath said hopper for pivotal movement about a vertical axis, said guiding and control link including a yoke pivotally mounted for movement about an axis extending longitudinally thereof and connecting members transversely pivoted to said yoke and to said gathering unit, to permit said gathering element to follow an uneven mine floor while being moved about said base, and said connecting members being extensible to permit adjustable movement of said gathering unit towards or from said base.

4. In a loading device for a shaker conveyer trough line, a base adapted to be held from movement with respect to the ground, a hopper mounted on said base for reciprocable movement with respect thereto and communicating with and having connection with the inby end of said trough line, an independently operable mobile gathering unit adapted to pick up material from the ground and discharge it into said hopper, and a guiding connection between said base and gathering unit for holding said gathering unit in fixed spaced relation with respect to said base and for guiding said gathering unit for movement about said base including a guiding and control link mounted on said base beneath said hopper for pivotal movement about a vertical axis, said guiding and control link having an intermediate yoke pivotally mounted for movement about an axis extending longitudinally thereof and a pair of spaced apart extensible members connecting said yoke with said gathering unit, to permit said gathering unit to follow an uneven mine floor while being moved about said base and to be adjustably moved towards and from said base, said extensible members being transversely pivoted to said yoke at one of their ends and transversely pivoted to said gathering unit at their opposite ends.

5. In a loading device for a shaker conveyer trough line, a base adapted to be fixed from movement with respect to the ground, a hopper mounted on said base for reciprocable movement with respect thereto and communicating with and having connection with the inby end of the shaker conveyer trough line, another base mounted for movement along the ground on its bottom, reciprocating and extensible trough sections mounted on said movable base, a shovel on the forward end of said extensible trough section, drive mechanism on said base for reciprocably driving said reciprocating and extensible trough sections, power means mounted on said movable base for moving said base and reciprocable and extensible trough sections with respect to said fixed base, and a link pivotally connected between said bases and holding said second mentioned base for movement with respect to said first mentioned base about a vertical axis intersecting said hopper, to maintain the discharge end of said reciprocating trough section in communication with said hopper.

6. In a loading machine for a shaker conveyer trough line, a base adapted to be fixed from movement with respect to the ground, a hopper mounted on said base for reciprocable movement with respect thereto and communicating with and having connection with the inby end of the shaker conveyer trough line, another base mounted for movement along the ground on its bottom, reciprocating and extensible trough sections mounted on said movable base, said extensible trough section having a shovel on its forward end adapted to pick up material from the ground, drive mechanism on said base for reciprocably driving said reciprocating and extensible trough sections, and an extensible link pivotally connected with said fixed base for movement about a vertical axis and transversely pivotally connected with said movable base, permitting sliding and extensible and retractible movement of said second base along the ground with respect to said first base and maintaining the discharge end of said reciprocating trough section in communication with said hopper.

7. In a shaker conveyer and in combination with a shaker conveyer trough line, a base at the forward end of the trough line, a hopper communicating with the forward end of the trough line and mounted on said base for reciprocable movement with respect thereto, means for picking up loose material and discharging it into said hopper including a reciprocating trough section, an extensible trough section nested therein and means for extending or retracting said extensible trough section with respect to said reciprocating trough section, a movable base forming a support for said trough sections, power means for moving said base, and a horizontally swingable link spacing said bases apart and forming a pivotal guiding connection between said bases, to permit said movable base to be slidably moved along the ground about said first base and to hold said bases in fixed spaced relation with respect to each other, said link having pivotal connection with said first mentioned base, for movement about a vertical axis intersecting said hopper and having transverse pivotal connection with said movable base, and said link including an intermediate member pivotally movable about an axis extending longitudinally thereof, to permit said movable base to follow an uneven bottom, while being moved about said vertical axis.

8. In a shaker conveyer and in combination with a shaker conveyer trough line, a base at the forward end of the trough line, a hopper communicating with the forward end of the trough line and mounted on said base for reciprocable movement with respect thereto, means for picking up loose material and discharging it into said hopper including a reciprocating trough section, an extensible trough section nested therein and means for extending or retracting said extensible trough section with respect to said reciprocating trough section, a movable base forming a support for said trough sections, power means for moving said base, and a horizontally swingable link spacing said bases apart and forming a pivotal guiding connection between said bases, to permit said movable base to be slidably moved along the ground about said first base and to hold said bases in fixed spaced relation with respect to each other, said link having pivotal connection with said first mentioned base for movement about a vertical axis intersecting said hopper, and having transverse pivotal connection with said movable base, and said link including an intermediate member pivotally movable about an axis extending longitudinally thereof and a pair of spaced apart members transversely pivoted to said intermediate member at one of their ends and to said movable base at their opposite ends.

9. In a shaker conveyer and in combination with a shaker conveyer trough line, a base at the forward end of the trough line, a hopper communicating with the forward end of the trough line and mounted on said base for reciprocable movement with respect thereto, means for picking up loose material and discharging it into said hopper including a reciprocating trough section, an extensible trough section nested therein and means for extending or retracting said extensible trough section with respect to said reciprocating trough section, a movable base forming a support for said trough sections, power means for moving said base, and a horizontally swingable link spacing said bases apart and forming a pivotal guiding connection between said bases to permit said movable base to be slidably moved along the ground about said first base and to hold said bases in fixed spaced relation with respect to each other, said link having pivotal connection with said first mentioned base, for movement about a vertical axis intersecting said hopper and having transverse pivotal connection with said movable base, and said link including an intermediate member pivotally movable about an axis extending longitudinally thereof and a pair of spaced apart extensible members transversely pivoted to said intermediate member, said spaced apart members having transverse pivotal connection with said movable base at their ends opposite said intermediate member and forming a means for adjustably holding said movable base in fixed relation with respect to said stationary base to permit said movable base to follow an uneven mine bottom and be adjustably moved towards and from said stationary base.

10. In a loading device for a shaker conveyer trough line, a base adapted to be fixed from movement with respect to the ground, a hopper mounted on said base for reciprocable movement with respect thereto and communicating with and having connection with the inby end of the shaker conveyer trough line, another base mounted for movement along the ground on its bottom, reciprocating and extensible trough sections mounted on said movable base, said extensible trough section having a shovel on its forward end adapted to pick up material from the ground, drive mechanism on said movable base for reciprocably driving said reciprocating and extensible trough sections, a pivotal connection between said bases for holding said movable base for movement with respect to said first mentioned base about a vertical axis intersecting said hopper to hold said movable base in fixed spaced relation with respect to said hopper and to maintain the discharge end of said reciprocating trough section in communication with said hopper including a link pivoted to said fixed base at one of its ends, for movement about a vertical axis, and to said movable base at its opposite end, for movement about a transverse axis, and flexible power means on said movable base, for moving said base along the ground about said vertical pivotal axis of connection of said link to said first mentioned base.

11. In a loading machine for a shaker conveyer trough line, a base adapted to be fixed from movement with respect to the ground, a hopper mounted on said base for reciprocable movement with respect thereto and communicating with and having connection with the inby end of the shaker conveyer trough line, a movable base spaced from said first base and adapted to be moved along the ground on its bottom, reciprocating and extensible trough sections mounted on said movable base, said extensible trough section having a shovel on its forward end adapted to pick up material from the ground, drive mechanism on said movable base for reciprocably driving said reciprocating and extensible trough sections, an extensible link having vertical pivotal connection with said fixed base for movement about a vertical axis intersecting said hopper and having transverse pivotal connection with said movable base, permitting sliding movement of said movable base about said first base and permitting adjustable extensible and retractile movement of said movable base with respect to said fixed base, flexible power means on said movable base for moving said base about said axis of connection of said link to said first base, and other flexible power means for adjustably moving said movable base towards and from said first mentioned base.

12. In a loading machine for a shaker conveyer trough line, a base adapted to be fixed from movement with respect to the ground, a hopper mounted on said base for reciprocable movement with respect thereto and communicating with and having connection with the inby end of the shaker conveyer trough line, a second base spaced from said first base and adapted to be moved along the ground on its bottom, reciprocating and extensible trough sections mounted on said second base, said extensible trough section having a shovel on its forward end adapted to pick up material from the ground, drive mechanism on said base for reciprocably driving said reciprocating and extensible trough sections, an extensible link having vertical pivotal connection with said fixed base for movement about a vertical axis intersecting said hopper and having transverse pivotal connection with said second base, permitting sliding movement of said second base about said first base and extensible and retractible movement of said second base with respect to said first base, flexible power means on said second base for moving said base about said axis of connection of said link to said first base, and other flexible power means for adjustably moving said second base towards and from said first mentioned base, said flexible power means including a motor on said second base, and a plurality of winding drums adapted to be independently driven from said motor and having flexible cables thereon adapted to be connected to fixed abutments remote from said base, for moving said base upon the application of power to said winding drums.

13. In a loading device for a shaker conveyer trough line, a base adapted to be stationary on the ground during operation of the conveyer, a hopper mounted on said base for reciprocable movement with respect thereto and communicating with and having connection with the inby end of said shaker conveyer trough line, an independently operable mobile gathering unit having a discharge end arranged in cascade relation with respect to said hopper and adapted to pick up material from the ground and discharge it into said hopper, and a guiding and control connection between said base and gathering unit including an extensible control link connected with said gathering unit and mounted on said base for pivotal movement about a vertical axis, for guiding said gathering unit for movement about said base and permitting extension or retraction of said gathering unit with respect to said base.

14. In a loading device for a shaker conveyer trough line, a base adapted to be fixed from movement with respect to the ground, a hopper mounted on said base for reciprocable movement with respect thereto and communicating with and having connection with the inby end of the shaker conveyer trough line, another base spaced from said first mentioned base and adapted to be moved along the ground on its bottom, a reciprocating trough section and an extensible trough section mounted on said movable base, said extensible trough section having a shovel on its forward end adapted to pick up material from the ground, drive mechanism on said base for reciprocably driving said reciprocating and extensible trough sections, and an extensible control link connected between said bases and controlling movement of said second mentioned base about said first mentioned base and permitting extensible or retractible movement of said second mentioned base with respect to said first mentioned base and holding said bases in fixed spaced relation with respect to each other when in their extended or retracted positions, to cause the discharge of material from said reciprocating trough section into said hopper in all positions of said bases with respect to each other.

LOYAL F. CRAWFORD.